US008126452B2

(12) United States Patent
Ries et al.

(10) Patent No.: US 8,126,452 B2
(45) Date of Patent: Feb. 28, 2012

(54) SYSTEMS AND METHODS FOR SELF-CALIBRATING TRANSCEIVERS

(75) Inventors: Christian Ries, Kalchreuth (DE); Walter Kodim, Stein (DE)

(73) Assignee: Intel Mobile Communications GmbH, Neubiberg (DE)

( * ) Notice: Subject to any disclaimer, the term of this patent is extended or adjusted under 35 U.S.C. 154(b) by 784 days.

(21) Appl. No.: 11/947,630

(22) Filed: Nov. 29, 2007

(65) Prior Publication Data

US 2009/0143015 A1    Jun. 4, 2009

(51) Int. Cl.
*H04W 24/00* (2009.01)
(52) U.S. Cl. ............. 455/425; 455/423; 455/67.11; 455/67.13; 455/67.14; 455/115.1; 455/115.2; 455/115.3; 455/226.1; 455/226.2; 324/522; 324/523; 324/750.01; 324/750.02
(58) Field of Classification Search .......... 455/423, 455/425, 67.11–67.16, 115.1–115.3, 226.1–226.3; 324/522, 523, 527, 528, 763, 763.01, 750.01, 324/750.02
See application file for complete search history.

(56) References Cited

U.S. PATENT DOCUMENTS

| 5,835,850 | A  | * | 11/1998 | Kumar .................... 455/67.14 |
| 6,118,811 | A  | * | 9/2000  | Narumi et al. ............ 375/219 |
| 6,397,042 | B1 | * | 5/2002  | Prentice et al. ........... 455/67.14 |
| 6,535,731 | B1 | * | 3/2003  | Pillekamp et al. |
| 6,832,075 | B1 | * | 12/2004 | Henry, Jr. ................ 455/67.14 |
| 6,987,951 | B2 | * | 1/2006  | Boos |
| 7,103,343 | B2 | * | 9/2006  | Boos |
| 7,130,589 | B2 | * | 10/2006 | Lee et al. ................. 455/67.11 |
| 7,139,540 | B2 | * | 11/2006 | Wu et al. |
| 7,269,404 | B2 | * | 9/2007  | Yoneu ....................... 455/403 |
| 7,379,716 | B2 | * | 5/2008  | Eisenstadt et al. ......... 455/126 |
| 2003/0095607 | A1 | * | 5/2003 | Huang et al. |

FOREIGN PATENT DOCUMENTS

| EP | 0848260 A2 | 6/1998 |
| EP | 1645030 | 1/2005 |
| WO | WO2004100396 A1 | 11/2004 |

* cited by examiner

*Primary Examiner* — Tuan A Tran
(74) *Attorney, Agent, or Firm* — Eschweiler & Associates, LLC

(57) ABSTRACT

Techniques for self-calibration of transceivers are described herein.

20 Claims, 4 Drawing Sheets

SYSTEMS AND METHODS FOR SELF-CALIBRATING TRANSCEIVERS

BACKGROUND

Mobile communication devices typically include a transceiver for transmitting and receiving communication signals. Such transceivers may be configured to operate over multiple frequency bands using modern systems such as the Universal Mobile Telecommunication System (UMTS) or the International Mobile Telecommunication System 2000 (IMT-2000), or more conventional systems such as the Global System for Mobile Communication (GSM). By assigning separate carrier frequencies to inbound and outbound signals, transceivers may advantageously enable inbound and outbound data rates to be approximately equal.

In particular, cellular telephone networks operate on the principle that communication signals are transmitted over specified bands of inbound and outbound frequencies (or channels). The frequencies used in one "cell" or area can be reused in other cells. Communications are handed off from cell to cell as a user moves between cells, often with a change of communication frequencies (transmit and receive) involved in the handoff. Thus, the transceivers of modern communication devices are configured to operate over a range of inbound and outbound signal frequencies. To maintain the quality and integrity of telecommunications, however, calibration (or re-calibration) of such multi-band transceivers may be desired.

BRIEF DESCRIPTION OF THE DRAWINGS

The detailed description is described with reference to the accompanying figures. The use of the same reference numbers in different instances in the description and the figures may indicate similar or identical items.

DETAILED DESCRIPTION

Disclosed herein are improved techniques for self-calibrating transceivers such as those used, for example, in modern communication devices. In general, techniques in accordance with the present disclosure may advantageously improve performance and reliability of communication devices by enabling self-calibrations, without the need for external calibration equipment or pre-stored calibration data. Thus, costs associated with device maintenance and repairs may be reduced, and overall system efficiencies may be maintained or improved.

Techniques for self-calibrating transceivers in accordance with the present disclosure may be implemented in a number of ways and in a wide variety of systems and devices. Exemplary implementations are described below with reference to the included figures and the on going discussion.

Exemplary Systems

Figure 1:
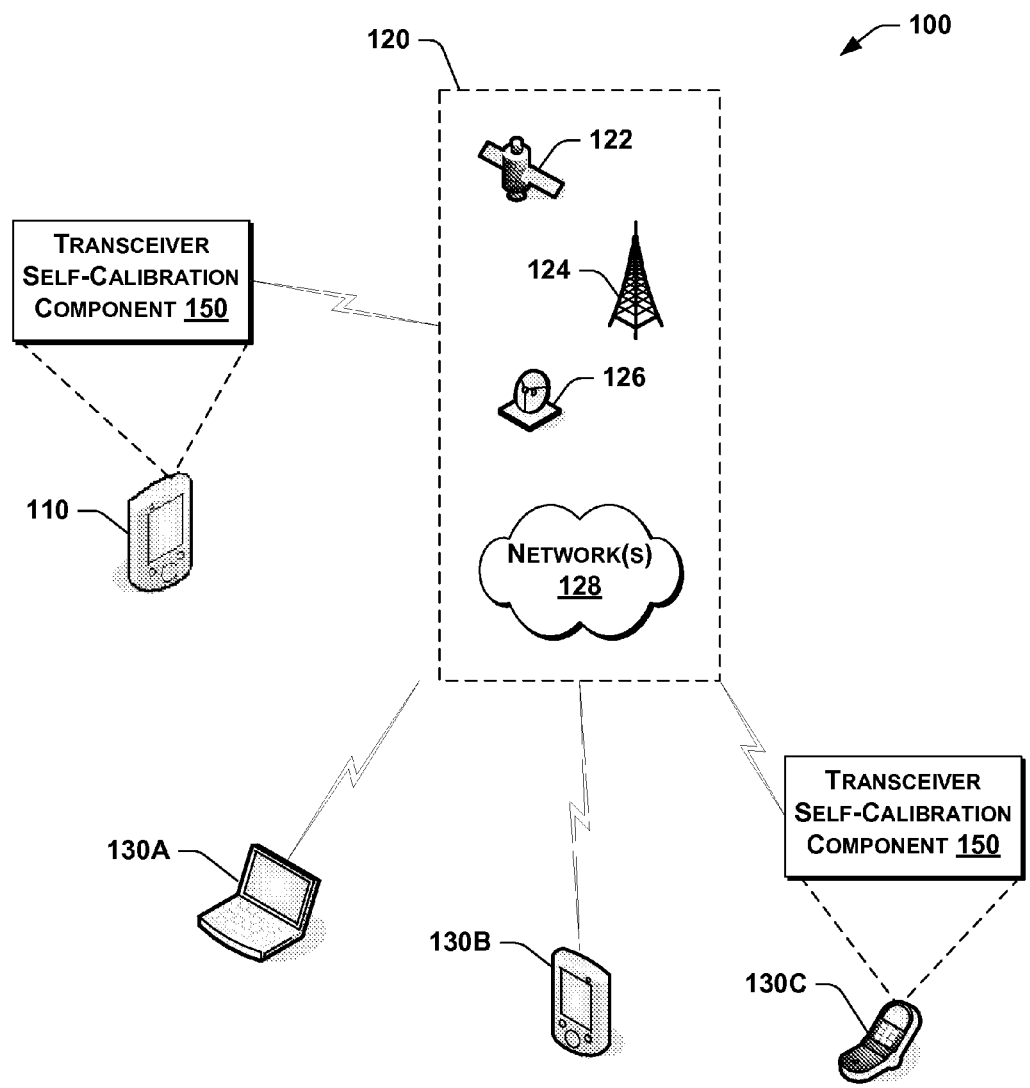
FIG. 1 is an exemplary environment in which techniques in accordance with the present disclosure may be implemented.

FIG. 1 illustrates an exemplary environment 100 in which techniques in accordance with the present disclosure may be implemented. In this implementation, the environment 100 includes a communication device 110 having a transceiver self-calibration component 150 configured in accordance with the teachings of the present disclosure. The transceiver self-calibration component 150 may include hardware, software, and firmware components, as described more fully below. In this implementation, the communication device 110 operatively communicates via an infrastructure 120 with one or more other communication devices 130. Alternatively, the communication device 110 may bypass the infrastructure 120 and communicate directly with one or more of the other devices 130. Detailed descriptions of various aspects and implementations of the transceiver self-calibration component 150 are provided in the following sections.

In the representative environment 100, the communication device 110 is a hand-held device, such as an MP3 (Moving Picture Exerts Group Layer-3) player, a personal data assistant (PDA), a global positioning system (GPS) unit, or other similar hand-held device. Similarly, the other devices 130 may include, for example, a computer 130A, another hand-held device 130B, and a cellular telephone 130C. In alternate implementations, of course, the devices 110, 130 may include any other suitable devices. Furthermore, it is understood that any of the other communication devices 130 may be equipped with transceiver self-calibration components 150 that operate in accordance with the teachings of the present disclosure, such as the cellular telephone 130C.

The infrastructure 120 may include a variety of suitable communication components operatively coupled to provide the desired telecommunications functionality. Various exemplary communication components of the infrastructure 120 are shown in FIG. 1 for illustrative purposes. For example, in some implementations, the infrastructure 120 may include one or more of the following: a communications satellite 122, an antenna tower 124, a communications dish 126, and one or more networks 128. Alternately, other communications components may be used. In particular implementations, the infrastructure 120 may include those components that make up a Core Network (CN) and a UMTS Terrestrial Radio Access Network (UTRAN) of a modern UMTS (Universal Mobile Telecommunication System).

Figure 2:
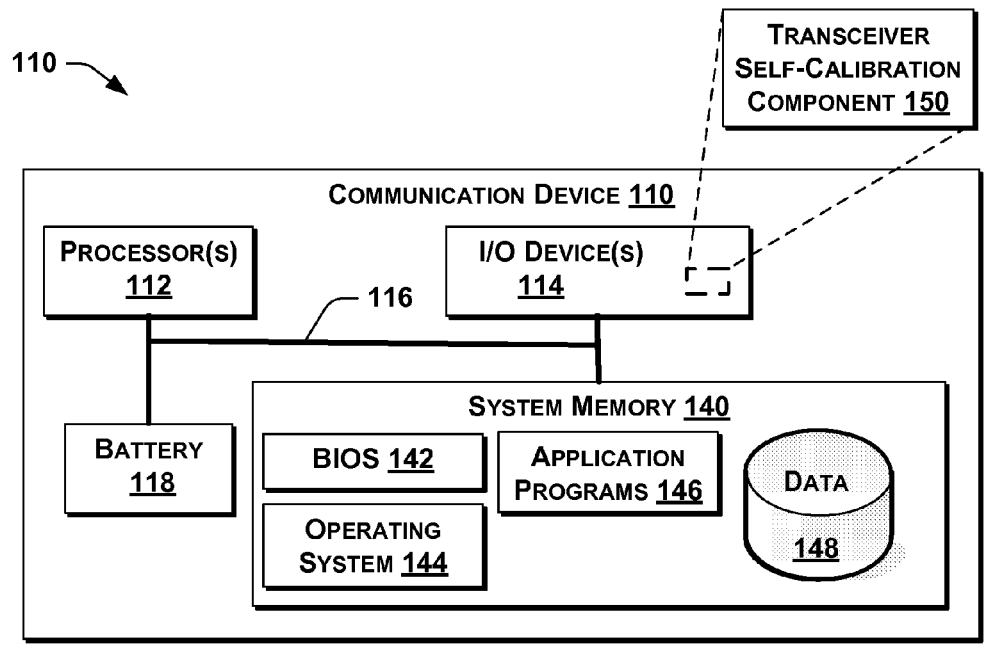
FIG. 2 is an exemplary mobile device having a transceiver self-calibration capability in accordance with the present disclosure.

FIG. 2 is an exemplary implementation of the mobile device 110 having the transceiver self-calibration component 150 in accordance with the present disclosure. The communication device 110 includes one or more processors 112 and one or more input/output (I/O) devices 114 coupled to a system memory 140 by a bus 116. A battery 118 provides power to the components of the communication device 110. In the implementation shown in FIG. 2, the transceiver self-calibration component 150 is depicted as being included within the I/O device 114. In alternate implementations, however, the transceiver self-calibration component 150 may be a separate, individual component of the device 110, or may be integrated with any other suitable portion of the device 110.

The system bus 116 represents any of the several types of bus structures, including a memory bus or memory controller, a peripheral bus, an accelerated graphics port, and a processor or local bus using any of a variety of bus architectures. The I/O device 114 may be configured to operatively communicate with one or more portions or components of the infrastructure 120 (e.g., Internet, intranet, cellular network, cable network, fiber optic network, infrared or radio antennas, LAN, WAN, etc.), or directly with other communication devices.

The system memory 140 may include computer-readable media configured to store data and/or program modules for implementing the techniques disclosed herein that are immediately accessible to and/or presently operated on by the processor 112. For example, the system memory 140 may also store a basic input/output system (BIOS) 142, an operating system 144, one or more application programs 146, and program data 148 that can be accessed by the processor 112 for performing various tasks desired by a user of the communication device 110.

Moreover, the computer-readable media included in the system memory 140 can be any available media that can be accessed by the device 110, including computer storage media and communication media. Computer storage media may include both volatile and nonvolatile, removable and non-removable media implemented in any method or technology for storage of information such as computer-readable instructions, data structures, program modules, or other data. Computer storage media includes, but is not limited to, and random access memory (RAM), read only memory (ROM), electrically erasable programmable ROM (EEPROM), flash memory or other memory technology, compact disk ROM (CD-ROM), digital versatile disks (DVD) or other optical disk storage, magnetic cassettes, magnetic tape, magnetic disk storage or other magnetic storage devices, or any other medium, including paper, punch cards and the like, which can be used to store the desired information and which can be accessed by the communication device 110.

Similarly, communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection and wireless media such as acoustic, RF, infrared and other wireless media. Combinations of any of the above should also be included within the scope of computer readable media.

Generally, program modules executed on the device 110 (FIG. 2) may include routines, programs, objects, components, data structures, etc., for performing particular tasks or implementing particular abstract data types. These program modules and the like may be executed as a native code or may be downloaded and executed such as in a virtual machine or other just-in-time compilation execution environments. Typically, the functionality of the program modules may be combined or distributed as desired in various implementations.

Although the exemplary environment 100 is shown as in FIG. 1 as a communication network, this implementation is meant to serve only as a non-limiting example of a suitable environment for use of the transceiver self-calibration component 150 in accordance with present disclosure. Similarly, the device 110 is simply one non-limiting example of a suitable device that may include a transceiver self-calibration component 150 in accordance with the present disclosure.

Exemplary Transceiver Self-Calibration Circuits

Structural and operational aspects of implementations of self-calibration capabilities for transceivers will now be described. In various implementations, self-calibration capabilities for transceivers may be implemented internally or externally, or even a combination of partially internal and partially external, to the transceiver being calibrated. In the following discussion, it should be appreciated that unless otherwise specified, the described implementations are not necessarily limited to any particular configuration of internal, external, or combination of internal and external implementations.

Figure 3:
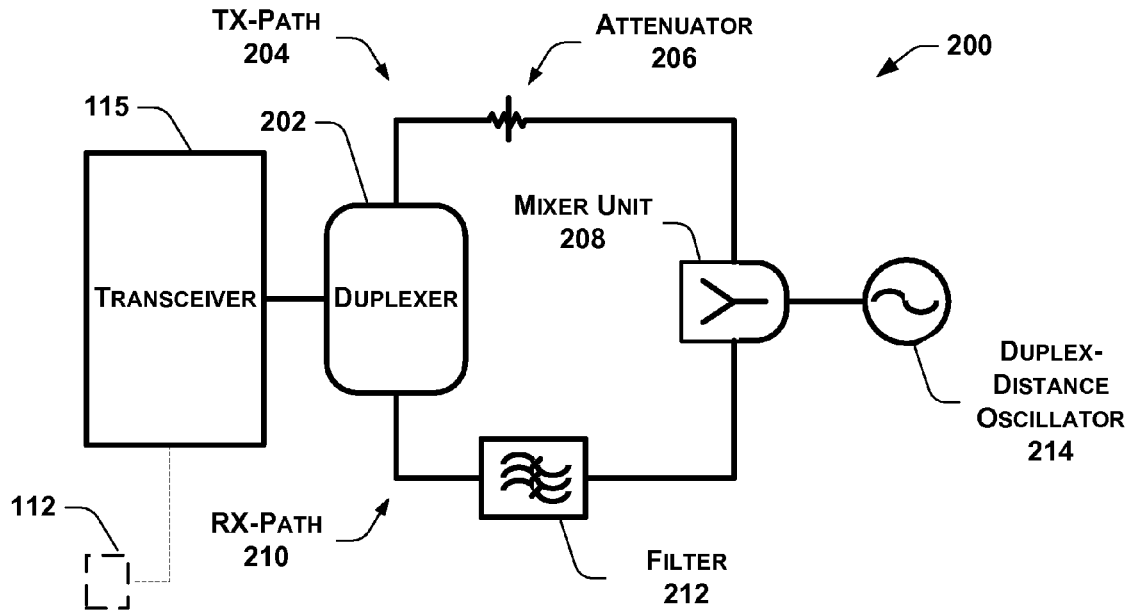
FIG. 3 is an exemplary transceiver self-calibration circuit in accordance with an implementation of the disclosure.

For example, FIG. 3 is an exemplary transceiver self-calibration circuit 200 in accordance with an implementation of the present disclosure. In this implementation, a duplexer 202 is coupled to receive signals from a transceiver 115 that is to be calibrated. The transceiver 115 may be, for example, a UMTS transceiver of the I/O device 114 of FIG. 2, and the duplexer 202 may be coupled to an antenna of the transceiver 115. A transmission path 204 that includes an attenuator 206 couples the duplexer 202 to a mixer unit 208. Similarly, a reception path 210 that includes a filter 212 is coupled between the mixer unit 208 and the duplexer 202. A duplex-distance oscillator (or other suitable signal generator) 214 is coupled to the mixer unit 208.

The passband of the filter 212 is tuned to the receiver frequency. In some implementations, the filter 212 may be part of the duplexer 202. More specifically, the duplexer 202 may be a combination of lowpass and highpass filters, and the low and highpass filters can also be bandpass filters. Thus, depending on the choice of the duplexer 202, and also the mixer 208 and the quality of the receiver input, the requirement of the filter 212 can be reduced or eliminated.

The optional filter 212 may also be used to enhance accuracy in the case of unwanted mixing products from the mixer 208, such as, for example, "inband blocking." For example, the output of the mixer 208 may be either an input signal frequency (fin), an output signal frequency (fosc), or a combination of the input and output signal frequencies (e.g. |fin+fosc|, or |fin-fosc|). Alternately, due to the nature of the mixer 208, the output of the mixer 208 may be only |fin+fosc| and |fin-fosc|. There are also mixers architectures available that have only the wanted mixing product as an output whereas unwanted products are suppressed. Thus, in various implementations, the filter 212 may be switchably controlled between being operational to perform the desired bandpass filtering as needed, or being non-operational when conditions allow.

The duplexer 202 separates inbound signals that are being sent to the transceiver 115 from outbound signals that are transmitted from the transceiver 115. A transmit signal from the transceiver 115 that will be used for a self-calibration process is received by the duplexer 202 and transmitted along the transmission path 204. The attenuator 206 is an optional component and may be used to adjust a strength of the transmit signal to a desired level for the mixer unit 208.

A transceiver's transmission frequency is typically separated from the transceiver's reception frequency by a frequency difference (or duplex distance). In the circuit 200, the duplex-distance oscillator 214 provides a shift signal to the mixer unit 208, and the mixer unit 208 shifts the transmit signal with the shift signal (e.g., the duplex distance) to provide a shifted transmit signal so that the receiving portion of the transceiver 115 can directly measure the intensity level of the shifted transmit signal. In some implementations, the duplex-distance oscillator 214 may be varied to provide differing shift signals (or duplex distances) such as may be desired for multiband transceiver operations.

With continued reference to FIG. 3, the shifted transmit signal from the mixer unit 208 is filtered by the filter 212 and is provided by the duplexer 202 back to the transceiver 115. Again, in some implementations, the filter 212 may be a switchable filter that is switched for multiband operations to provide various band-pass frequency values. Alternately, if the transceiver 115 transmits in a single frequency band, the filter 212 and the oscillator 214 need not be switchable or adjustable.

For example, in some implementations, multiband UMTS operations using the transceiver 115 and transceiver self-calibration circuit 200 may be performed using exemplary values as set forth in Table 1 below:

TABLE 1

Exemplary Values for Multiband UMTS Operations

| Band | Frequency | UMTS TX | UMTS RX |
|---|---|---|---|
| 1 | 190 MHz | 1950.0 | 2140.0 |
| 2 | 80 MHz | 1880.0 | 1960.0 |
| 4 | 400 MHz | 1732.4 | 2132.4 |
| 5 | 45 MHz | 836.4 | 881.4 |

By using either a transmitter device with sufficient accuracy for at least one power level, or by having the means to measure the level accuracy precisely for at least one power level, the conversion gain of the transceiver 115 can be accurately determined for at least one power level. More specifically, when all of the losses associated with the components of the self-calibration circuit 200 are known (e.g., attenuator 206 losses, mixer unit 208 losses, etc.), and having at least one accurate level, the transmit signal from the transceiver 115 can be adjusted by the self-calibration circuit 200 and received back into the transceiver 115, and the conversion gain of the transceiver 115 can be determined, such as by using the processor 112 other appropriate logic component. After determining the conversion gain at a first band, the transceiver 115 can be calibrated at the first band, and assuming linearity of the components of the self-calibration circuit 200 (e.g. filter 212), the transceiver 115 can be calibrated at other operating bands.

For example, in some implementations, assuming that the transmitting portion of the transceiver 115 is accurate at a particular power level (or band), then the conversion gain may be determined and the receiving portion of the transceiver 115 may be calibrated at that particular power level (or band). Assuming sufficient linearity of the receiving portion, the transmitting portion of the transceiver 115 may then be calibrated at other power levels (or bands).

In the event that the transceiver self-calibration circuit 200 is implemented as an external solution, the line between the transceiver 115 and the duplexer 202 may be the antenna connection for the communication device 110. Such an external solution could be used, for example, for laboratory purposes or field trials, such as when calibration data becomes invalid when a software update occurs, or simply when the calibration data is lost.

Figure 4:
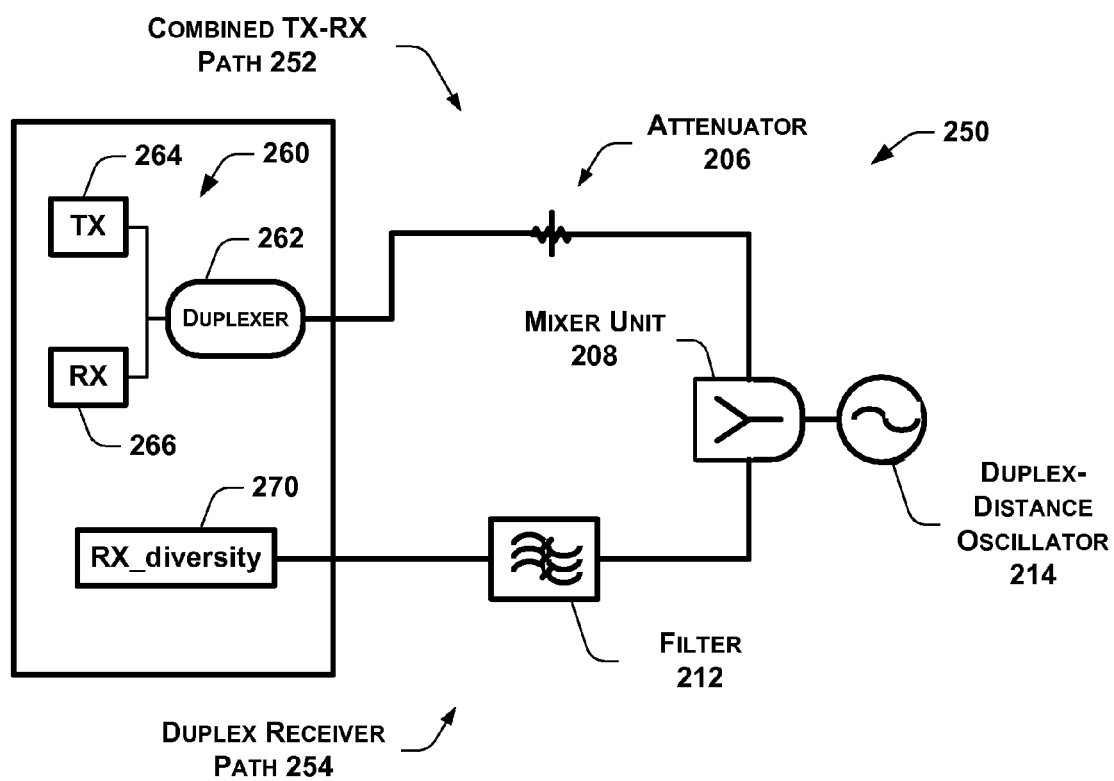
FIG. 4 is an exemplary transceiver self-calibration circuit in accordance with another implementation of the disclosure.

It will be appreciated that a variety of alternate implementations may be conceived. For example, FIG. 4 is an exemplary transceiver self-calibration circuit 250 in accordance with another implementation of the disclosure. Many of the components of the transceiver self-calibration circuit 250 are similar to the previously-described implementation (FIG. 3). Therefore, for the sake of brevity, only some of the more significant differences between the transceiver self-calibration circuit 250 and the previously-described circuit 200 will be described in detail.

In the implementation shown in FIG. 4, the transceiver self-calibration circuit 250 has a combined transmit-receive path 252 coupled to an internal duplexer 262 of a transceiver 260. The transceiver 260 includes a transmitter portion 264 and a receiver portion 266 coupled to the duplexer 262. The combined transmit-receive path 252 may be coupled to the antenna that handles the combined transmission and reception capabilities of the transceiver 260. A duplex receiver path 254 is coupled between the mixer unit 208 and a diversity receiver 270.

The diversity receiver 270 is an independent, second receiver that is normally used for receiving the same signal as the "main" receiver portion 266 of the transceiver but with a different antenna. The diversity receiver 270 receives a different phase of the downlink signal. Internally, the reception of the main receiver portion 266 and the diversity receiver 270 may be calculated in such a way (e.g. by the processor 112) that the better result of both receivers is used for demodulation. This method may greatly reduce fading effects and may thereby increase system sensitivity.

In operation, the transceiver self-calibration circuit 250 receives a transmit signal from the transceiver 220 that will be used for a self-calibration process, conditions the transmit signal using the attenuator 206, and provides the conditioned transmit signal to the mixer unit 208. The duplex-distance oscillator 214 provides a shift signal to the mixer unit 208, and the mixer unit 208 shifts the transmit signal with the shift signal (e.g., the duplex distance) to provide a shifted transmit signal. After filtering by the filter 212, the shifted transmit signal is input to the diversity receiver 230.

The implementation of the transceiver self-calibration circuit 250 of FIG. 4 advantageously eliminates the duplexer 202 of the previously-described implementation (FIG. 3). And by taking the transmitter signal and receiver signals just before they enter the internal duplexer 262 of the transceiver 260, the circuit 250 also eliminates the need to change the corner frequencies when having a multiband system.

In the implementation shown in FIG. 4, the frequency of the diversity receiver 270 can be individually adjusted from the "main" or "normal" receiver portion 266 of the transceiver 260. This means that fixed duplex frequencies, such as those shown in Table 1 above, are not needed anymore for individual bands. For this system, the frequency of the diversity receiver 270 may be tuned to a frequency which is derived (or calculated) from the shifted transmit frequency. Thus, the circuit 250 can result in a solution which needs just one duplex distance oscillator frequency and still can work in bands with different duplex frequencies.

Implementations of transceiver self-calibration systems and methods in accordance with the present disclosure may provide significant advantages. For example, if a communication device or other unit is operating strangely, providing transceiver self-calibration capabilities may significantly reduce time and expense associated with diagnosing and correcting problems by simply enabling the transceiver to be re-calibrated using the transceiver self-calibration capabilities disclosed herein.

Exemplary Process

An exemplary process for self-calibration of transceivers in accordance with the present disclosure will now be described. For simplicity, the process will be described with reference to the exemplary implementations described above with reference to FIGS. 1-4.

Figure 5:
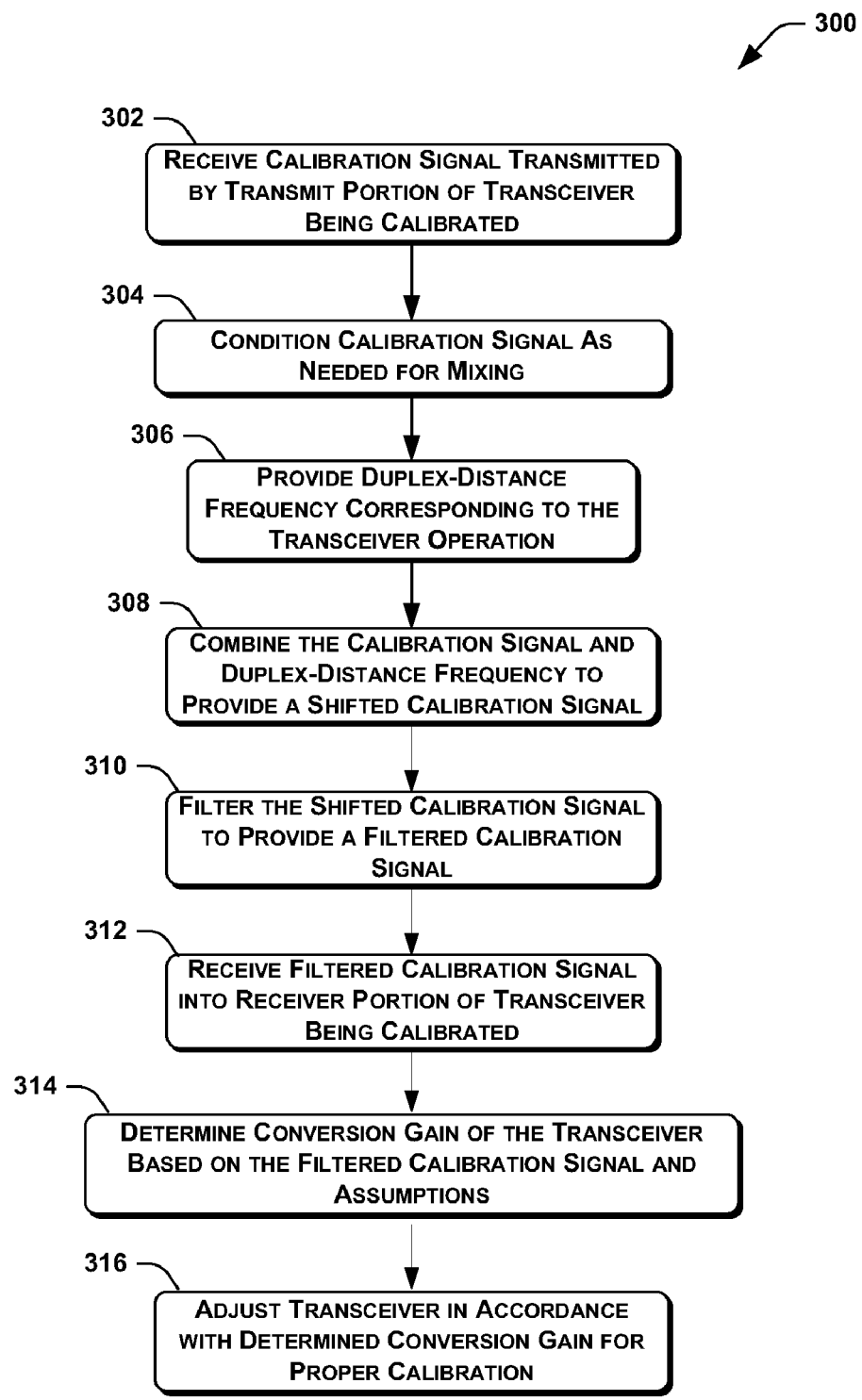
FIG. 5 is a flowchart of a process for calibrating a transceiver in accordance with an implementation of the present disclosure.

FIG. 5 is a flowchart of a process 300 for self-calibrating a transceiver in accordance with an implementation of the present disclosure. The process 300 is illustrated as a collection of blocks in a logical flow graph, which represents a sequence of operations that can be implemented in hardware, software, or a combination thereof. In the context of software, the blocks may represent computer instructions that, when executed by one or more processors, perform the recited operations.

More specifically, the process 300 receives a calibration signal transmitted by a transmit portion of the transceiver being calibrated at 302. The calibration signal may be received by a duplexer, a diversity receiver, or any other suitable component that is coupled to receive signals from the transceiver. Alternately, the calibration signal may be received directly from the transmit portion.

At 304, the calibration signal may be conditions, such as by an attenuator, in preparation for mixing. A shift frequency is provided by a signal generator at 306. In some implementations, the shift frequency is a duplex-distance frequency provided by an oscillator. In further embodiments, the oscillator or other suitable signal generator may be adjustable or switchable to operate at different frequencies, as may be needed for multiband transceiver calibration operations.

The calibration signal is combined (e.g., mixed) with the duplex-distance frequency at 308 to provide a shifted calibration signal. At 310, the shifted calibration signal is filtered to provide a filtered calibration signal. Again, in some implementations, the filtering device may be adjustable or switchable to operate at different frequencies, suitable for multiband transceiver calibration operations.

The filtered calibration signal is received into a receiver portion of the transceiver being calibrated at 312. Based on the filtered calibration signal, and certain assumptions about the operation of the transceiver and the known losses of the transceiver self-calibration circuit, the conversion gain of the transceiver is determined at 314. Finally, the transceiver may be adjusted in accordance with the determined conversion gain at 316 to provide a properly calibrated transceiver.

The process 300 shown in FIG. 5 is one of many possible implementations in accordance with the teachings of the present disclosure. For example, in alternate implementations, certain acts need not be performed in the order described, and may be modified, and/or may be omitted entirely, depending on the circumstances. Moreover, in various implementations, the acts described may be implemented by a computer, processor or other computing device based on instructions stored on one or more computer-readable media. The computer-readable media can be any available media that can be accessed by a computing device to implement the instructions stored thereon.

As noted above, techniques for self-calibration of transceivers in accordance with the present disclosure may advantageously reduce time and expense associated with diagnosing and correcting problems with communications devices. By enabling the transceiver to be re-calibrated using the transceiver itself, repair times and costs may be reduced, and the need for field-testing equipment may be reduced. In addition, the process of implementing software upgrades for communication devices may be improved.

CONCLUSION

For the purposes of this disclosure and the claims that follow, the terms "coupled" and "connected" have been used to describe how various elements interface. Such described interfacing of various elements may be either direct or indirect. Although the subject matter has been described in language specific to structural features and/or methodological acts, it is to be understood that the subject matter defined in the appended claims is not necessarily limited to the specific features or acts described. Rather, the specific features and acts are disclosed as preferred forms of implementing the claims.

We claim:

1. A circuit, comprising:
a transceiver coupled to a processor, the transceiver comprising a transmitter portion and a receiver portion; and
a self-calibration circuit coupled to the transceiver and including:
a mixer unit configured to combine an output signal from the transmitter portion of the transceiver and a shift signal, to provide a shifted calibration signal to the receiver portion of the transceiver; and
a signal generator to provide the shift signal, such that the shifted calibration signal corresponds to a receive frequency of the receiver portion of the transceiver,
wherein the processor is configured to determine a conversion gain of the transceiver at a first frequency band based on a measurement of the shifted calibration signal by the receiver portion of the transceiver and one or more assumptions regarding the transceiver and loss characteristics of the self-calibration circuit; and
wherein the self-calibration circuit is configured to calibrate the transceiver for the first frequency band and a second frequency band according to the conversion gain of the transceiver at the first frequency band.

2. The circuit of claim 1, wherein the signal generator comprises a duplex-distance oscillator and the shift signal comprises a duplex-distance frequency shift signal corresponding to the transceiver.

3. The circuit of claim 1, wherein the self-calibration circuit further includes a filter coupled between the mixer unit and the receiver portion of the transceiver to filter the shifted calibration signal prior to receipt by the receiver portion of the transceiver.

4. The circuit of claim 3, wherein at least one of the filter and the signal generator are controllably adjustable for multiband transceiver operations.

5. The circuit of claim 1, wherein the self-calibration circuit further includes:
a duplexer coupled to the transceiver;
a transmit path coupled to provide the output signal from the duplexer to the mixer unit; and
a receive path coupled to provide the shifted calibration signal from the mixer unit to the duplexer.

6. The circuit of claim 1, wherein the self-calibration circuit further includes:
a transmit path coupled to provide the output signal from an output antenna of the transceiver to the mixer unit; and
a receive path coupled to provide the shifted calibration signal from the mixer unit to an input of an internal duplexer of the transceiver.

7. The circuit of claim 1, wherein the self-calibration circuit further includes a diversity receiver configured to receive a variable frequency calibration signal from the transceiver and the shifted calibration signal from the mixer unit.

8. An electronic device, comprising:
a processor; and
a communication component operatively coupled to the processor and configured to at least one of receive and transmit communication signals, the communication component including:
a transceiver; and
a self-calibration circuit coupled to the transceiver and including:
a duplexer coupled to the transceiver and configured to:
receive an output signal from a transmitter portion of the transceiver; and provide a shifted calibration signal to a receiver portion of the transceiver;

a mixer unit coupled to the duplexer and configured to:
receive the output signal from the duplexer; and
combine the output signal and a shift signal, to provide the shifted calibration signal to the duplexer; and a signal generator to provide the shift signal, such that the shifted calibration signal corresponds to a receive frequency of the receiver portion of the transceiver, wherein the processor is configured to determine a conversion gain of the transceiver based on a measurement of the shifted calibration signal by the receiver portion of the transceiver and one or more assumptions regarding the transceiver and loss characteristics of the self-calibration circuit.

9. The device of claim 8, wherein the signal generator comprises a duplex-distance oscillator and the shift signal comprises a duplex-distance frequency shift signal corresponding to the transceiver.

10. The device of claim 8, wherein the self-calibration circuit further includes a filter coupled between the mixer unit and the duplexer to filter the shifted calibration signal prior to receipt by the receiver portion of the transceiver, and wherein at least one of the filter and the signal generator are controllably adjustable for multiband transceiver operations.

11. The device of claim 10, wherein the filter is switchably controlled, such that the filter operates to filter signals having a first range of frequencies and the filter is non-operational with regard to signals having a second range of frequencies.

12. The device of claim 8, wherein the self-calibration circuit further includes a diversity receiver coupled to receive a variable frequency calibration signal from the transceiver and the shifted calibration signal from the mixer unit.

13. A method, comprising:
providing a calibration signal from a transceiver, the calibration signal comprising an output signal from a transmitter portion of the transceiver;

shifting a frequency of the calibration signal to produce a shifted calibration signal such that the shifted frequency corresponds to a receive frequency of a receiver portion of the transceiver;

providing the shifted calibration signal to the receiver portion of the transceiver;

measuring the shifted calibration signal, by the receiver portion of the transceiver, to determine a calibration for the transmitter portion of the transceiver;

determining a conversion gain of the transceiver based on the shifted calibration signal; and calibrating the transceiver for a plurality of operating bands according to the conversion gain of the transceiver.

14. The method of claim 13, wherein shifting the frequency of the calibration signal includes shifting the frequency of the calibration signal by a duplex-distance frequency shift signal corresponding to the transceiver.

15. The method of claim 13, further comprising, prior to providing the shifted calibration signal to the receiver portion of the transceiver, filtering the shifted calibration signal.

16. The method of claim 15, wherein
shifting a frequency includes shifting the frequency by an adjustably controlled shift frequency based on an operating band of the transceiver.

17. The method of claim 15, wherein filtering the shifted calibration signal includes filtering by an adjustably controlled filtering parameter based on an operating band of the transceiver.

18. The method of claim 13, wherein providing a calibration signal from a transceiver includes providing the calibration signal from the transceiver to a duplexer.

19. The method of claim 13, wherein providing a calibration signal from a transceiver includes providing the calibration signal from the transceiver to a diversity receiver.

20. The method of claim 19, wherein providing a calibration signal from a transceiver to a diversity receiver includes providing a variable frequency calibration signal from the transceiver to the diversity receiver.

* * * * *